US007814419B2

(12) United States Patent
Fabritius

(10) Patent No.: US 7,814,419 B2
(45) Date of Patent: Oct. 12, 2010

(54) CHANGING AN ORIENTATION OF A USER INTERFACE VIA A COURSE OF MOTION

(75) Inventor: Henna Fabritius, Tampere (FI)

(73) Assignee: Nokia Corporation, Espoo (FI)

( * ) Notice: Subject to any disclaimer, the term of this patent is extended or adjusted under 35 U.S.C. 154(b) by 891 days.

(21) Appl. No.: 10/723,283

(22) Filed: Nov. 26, 2003

(65) Prior Publication Data
US 2005/0114788 A1 May 26, 2005

(51) Int. Cl.
G06F 3/01 (2006.01)
G06F 3/048 (2006.01)

(52) U.S. Cl. .................. 715/702; 715/764; 715/788
(58) Field of Classification Search .......... 715/702, 715/973
See application file for complete search history.

(56) References Cited

U.S. PATENT DOCUMENTS

| 5,345,543 | A | * | 9/1994 | Capps et al. | 345/654 |
|---|---|---|---|---|---|
| 5,463,725 | A | | 10/1995 | Henckel et al. | |
| 5,463,726 | A | * | 10/1995 | Price | 715/797 |
| 5,513,309 | A | * | 4/1996 | Meier et al. | 715/860 |
| 5,612,719 | A | | 3/1997 | Beernink et al. | |
| 5,936,619 | A | * | 8/1999 | Nagasaki et al. | 345/205 |
| 5,949,408 | A | * | 9/1999 | Kang et al. | 345/169 |
| 6,154,214 | A | * | 11/2000 | Uyehara et al. | 715/863 |
| 6,246,411 | B1 | * | 6/2001 | Strauss | 715/863 |
| 6,281,872 | B1 | * | 8/2001 | Cariffe | 345/658 |
| 6,301,497 | B1 | * | 10/2001 | Neustadter | 600/410 |
| 6,468,216 | B1 | * | 10/2002 | Powers et al. | 600/443 |
| 6,567,101 | B1 | * | 5/2003 | Thomas | 345/649 |
| 6,597,384 | B1 | * | 7/2003 | Harrison | 345/204 |
| 7,002,604 | B1 | * | 2/2006 | Barrus et al. | 345/649 |
| 7,010,755 | B2 | * | 3/2006 | Anderson et al. | 715/778 |
| 7,415,676 | B2 | * | 8/2008 | Fujita | 715/781 |
| 7,478,326 | B2 | * | 1/2009 | Holecek et al. | 715/716 |
| 2002/0033836 | A1 | | 3/2002 | Smith | |
| 2003/0184525 | A1 | | 10/2003 | Tsai | |

OTHER PUBLICATIONS

"Direct Graphics Manipulation;" IBM Technical Disclosure Bulletin; IBM Corp., New York; vol. 31, No. 12, May 1, 1989; pp. 364-366.
"Pen-Based Computing;" EDN Electrical Design News, Rogers Pub. Co., Englewood, CO; vol. 37, No. 9, Apr. 23, 1992; pp. 137-144.
Web pages: www.telme.at/en/t919/details.html.
Web pages: www.myorigo.com/index.php?section=Ourofferings.

* cited by examiner

Primary Examiner—William L Bashore
Assistant Examiner—David Phantana-angkool
(74) Attorney, Agent, or Firm—Alfred A. Fressola; Ware, Fressola, Van Der Sluys & Adolphson LLP

(57) ABSTRACT

The invention relates to a method for changing an orientation of a User Interface (UI), the method comprises the steps of detecting a course of motion that is performed on the UI, and changing the orientation of the UI with respect to a device in which the UI is integrated according to the detected course of motion. The course of motion that is performed on the UI may for instance be the dragging of an element across a touch-screen display or the drawing of a gesture on a touch-screen display. The invention further relates to a device, a mobile phone, a computer program and a computer program product.

30 Claims, 4 Drawing Sheets

CHANGING AN ORIENTATION OF A USER INTERFACE VIA A COURSE OF MOTION

FIELD OF THE INVENTION

The invention relates to a method for changing an orientation of a user interface.

BACKGROUND OF THE INVENTION

The ongoing miniaturization of hand-held multi-media devices such as Personal Digital Assistants (PDAs) or mobile phones in recent years appears to be only bounded by the perceptual limits of the human user. This particularly applies to the design of the User Interfaces (UIs) of hand-held devices, such as for instance displays or touch-screen displays, with a remarkable trend to increase the relative area of the hand-held device that is consumed by its UI. Portrayal of content on such UIs can be further improved by allowing for a change of the orientation of the UI with respect to the hand-held device said UI is integrated in. Such a change of the orientation of the UI may for instance take the shape of a rotation of the UI with respect to the hand-held device, so that said hand-held device can for instance be used in both horizontal and vertical position.

When the orientation of a UI is changed, the logic that controls the UI has to be adapted to the change of orientation.

FIG. 1a exemplarily depicts a mobile phone 1 with a rectangular UI 2 of size a×b. In the left figure of FIG. 1a, an image is displayed on the UI 2, for instance a snapshot taken by the user of a different mobile phone and sent to the user of the mobile phone 1 via the Multimedia Messaging Service (MMS). To view the snapshot properly, either the user of mobile phone 1 would have to rotate his mobile phone 1 by 90° clockwise, or the orientation of the UI would have to be rotated by 90° clockwise, as depicted in the right figure of FIG. 1a. Such a rotation of the orientation of the UI can be initiated by the user by pressing a key 3 on his mobile phone 1 or by browsing through the menu of his mobile phone 1 to find the menu option that allows for the rotation of the UI orientation. Rotation of the orientation of the UI 2 is performed in software, for instance by the UI controller of the mobile phone 1.

FIG. 1b shows a second example of improved portrayal of images on a UI 2 of a mobile phone 1 when rotating the orientation of the UI 2. A typical landscape image is to be viewed on the UI 2 of the mobile phone 1 as shown in the left figure of FIG. 1b. Due to the limited width of the UI 2, the landscape image is either re-sized to fit the width b of the UI 2, as shown in the upper left figure of FIG. 1b, or only a part of the entire image is displayed on the UI 2 by fitting the height of the image to the height of the display and inserting a scroll bar 4, so that the remaining parts on the right side of the image can be explored by the user of the mobile phone 1 by scrolling (see the lower left figure of FIG. 1b). Portrayal is improved by rotating the orientation of the UI 2 by 90° clockwise, for instance by pressing a key 3 of the mobile phone 1, that switches between portrait orientation (as on the left of FIG. 1b) and landscape orientation (as on the right of FIG. 1b). The full-size image then can be viewed under optimum exploitation of the dimensions of the UI 2.

In prior art devices, the orientation of a UI can be changed by pressing a hard key of the device, for instance a portrait/landscape key 3 as in the example of FIG. 1b. However, due to the limited size of hand-held devices, additional hard keys are generally difficult to place on the device, and assigning an already existing hard key additional functionality, for instance that the hard key has to be pressed for a longer duration to call the additional functionality, may distract the user of the device.

In further prior art, the change of the orientation of the UI is implemented as a menu option of a display menu. The user of the device then has to browse the devices menu and find the corresponding entry in order to change the orientation of the UI, which is a time-consuming and annoying task especially when the orientation of a UI has to be frequently changed. Furthermore, the unskilled user of the device may not be aware of the possibility to change the orientation of the UI or may get lost in the menu when searching for it.

A further prior art approach to cause the change of the orientation of a UI uses motion sensors in the device to determine if the device itself is rotated by a user. For instance, in the example of FIG. 1b, when the user rotates the mobile phone 1 with the image being displayed according to the upper or lower left figure by 90° clockwise, the rotation is sensed by the mobile phone 1, and the orientation of the UI 2 is automatically switched from portrait mode to landscape mode (see the right figure of FIG. 1b), without any further user interaction like pressing a hard key or similar. This approach, however, deprives the user of his freedom to choose in which orientation of the UI 2 he prefers to watch an image. Furthermore, this method may become unstable in a mobile environment where the mobile phone 1 is subject to frequent relocation and shocks.

SUMMARY OF THE INVENTION

It is proposed that a method for changing an orientation of a UI comprises detecting a course of motion that is performed on said UI, and changing said orientation of said UI with respect to the device said UI is integrated in according to said detected course of motion.

Said UI may for instance be a display or touch-screen display of a hand-held device. The orientation of said UI with respect to said device can be changed, for instance by rotating the UI with respect to said device. If said UI is a touch-screen display, then the complete display and input control logic is rotated. The method according to the present invention then allows a user of said device to use said device for instance in vertical and horizontal mode for both viewing content and for operating the touch-screen display. Said course of motion may be performed on said UI by a user of said device the UI is integrated in. Said course of motion is detected, and said orientation of said UI is changed according to said detected course of motion. For instance, if said course of motion is a part of a circle that is drawn on a touch-screen display with a stylus, the length of the circle may be indicative of the angle by which the UI orientation is to be changed. For instance, a half circle may initiate the rotation of the UI orientation by 180°, so that content is displayed upside-down on said UI.

According to a method of the present invention, said course of motion is performed on said UI via a UI interaction device. The user of the device into which said UI is integrated may require such a UI interaction device to perform the course of motion on said UI.

According to a method of the present invention, said UI is a touch-screen display and said UI interaction device is a touching device, in particular a stylus. Said touching device may equally well be the finger tip of a user. In addition to its text, image and/or video presentation capabilities, said touch-screen display may be capable of detecting courses of motion that are drawn or written on said display as if the display was a sheet of paper, and may be of resistive, capacitive or surface wave type. Said courses of motion may for instance be lines, characters, symbols, or a simple selection of designated areas of said touch-screen-display.

According to a method of the present invention, said UI interaction device is a device that controls the movement of an element on said UI, in particular a track-ball or a joystick. Said element being displayed on said UI may for instance be an arrow or a dot that is used for drawing or handwriting.

According to a method of the present invention, said course of motion is performed on said UI by dragging an element that is displayed on said UI. Said element may for instance be a small box in the right upper corner of the UI. Dragging is performed when a stylus is placed on said box to grab the box, and then is moved across the UI in order to initiate a change of the orientation of the UI. For instance, dragging the box to the right lower corner may cause a change of the orientation of the UI by 90° clockwise, dragging the box to the left upper corner may cause a change of the orientation of the UI by 90° counter-clockwise, and dragging the box to the left lower corner may cause a change of the orientation of the UI by 180°. Said element that is displayed on said UI may be a soft button that is already provided on said UI for other purposes, and is assigned additional functionality, i.e. to initiate the change of the orientation of said UI, only when being dragged across the UI.

According to a method of the present invention, said element is located near the edge of the UI. Said element then does not unnecessarily cover the center part of the displayed content.

According to a method of the present invention, said course of motion is performed on said UI by drawing a gesture on said UI. Gestures may for instance be handwritten characters or symbols that are recognized when being written on a touch-screen display or drawn on a UI by the aid of a joystick or track-ball. For each possible change of the orientation of the UI, one specific gesture may be defined. Alternatively, one gesture, such as a circle, may be defined for the change of the orientation of the UI.

According to a method of the present invention, said gesture is a circle or a part thereof. The degree of completeness of the circle and/or the direction of rotation of the circle may indicate by which angle the orientation of the UI is to be rotated. For instance, a quarter circle being drawn counter-clockwise may indicate that the orientation of the UI shall be rotated by 90° counter-clockwise.

According to a method of the present invention, said detected course of motion is visualized on said UI. The course of motion is then not only detected, but actively displayed on the UI, so that the user that performs the course of motion can control its accomplishment.

According to a method of the present invention, said orientation of said UI is changed by 90°, 180° or 270° with respect to the device said UI is integrated in. However, depending on the shape of the UI, smaller angle steps may be advantageous. For instance, in a circular UI, rotation steps of 1° or less may be preferred.

According to a method of the present invention, images that are displayed on said UI are transformed and/or re-scaled according to said changed orientation. Changing the orientation of a non-square UI may require transformation (for instance stretching/compressing to adapt both the height and width of an image to the height and width of the rotated UI) and/or re-scaling (to fit either the height of an image to the height of the rotated UI or the width of an image to the width of the rotated UI) of the images in order to optimally fit the dimensions of the rotated UI.

According to a method of the present invention, said UI is integrated in a hand-held device, in particular a mobile phone or a Personal Digital Assistant (PDA). However, the present invention may equally well be applied to television sets or computer monitors.

It is proposed that a computer program comprises instructions operable to cause a processor to perform the above-mentioned method steps. Said computer program may be executed by a central processing unit of a hand-held device such as a mobile phone or a PDA.

It is proposed that a computer program product comprises a computer program with instructions operable to cause a processor to perform the above mentioned method steps.

It is proposed that a device for changing an orientation of a UI comprises means for detecting a course of motion that is performed on said display, and means for changing said orientation of said UI with respect to a device said UI is integrated in according to said detected course of motion. Said device for changing an orientation of a UI and said device in which said UI is integrated may be the same device, or may be devices in the same device, as for instance a hand-held device.

According to a device of the present invention, said device for changing an orientation of a UI is integrated in a hand-held device, in particular a mobile phone or a Personal Digital Assistant (PDA).

It is proposed that a mobile phone comprises at least one UI, means for detecting a course of motion that is performed on said UI, and means for changing an orientation of said UI with respect to said mobile phone according to said detected course of motion. Said mobile phone may for instance comprise one large UI, for instance a display or a touch-screen display, for multimedia applications and one smaller UI for displaying telephone numbers, incoming messages and the like. Said UIs may for instance be located on opposite sides of the mobile phone. The orientation of said at least one UI with respect to said mobile phone can be changed, for instance by rotating said UI with respect to said mobile phone.

According to a mobile phone of the present invention, the mobile phone further comprises a UI interaction device, via which said course of motion is performed on said at least one UI.

According to a mobile phone of the present invention, said at least one UI is a touch-screen display and said display interaction device is a touching device, in particular a stylus.

According to a mobile phone of the present invention, said UI interaction device is a device that controls the movement of an element on said at least one UI, in particular a track-ball or a joystick.

According to a mobile phone of the present invention, said course of motion is performed on said at least one UI by dragging an element that is displayed on said at least one UI.

According to a mobile phone of the present invention, said course of motion is performed on said at least one UI by drawing a gesture on said at least one UI.

According to a mobile phone of the present invention, said mobile phone further comprises means for visualizing said detected course of motion on said at least one UI.

According to a mobile phone of the present invention, said orientation of said at least one UI is changed by 90°, 180° or 270° with respect to said mobile phone.

According to a mobile phone of the present invention, the mobile phone further comprises means for transforming and/or re-scaling images that are displayed on said at least one UI according to said changed orientation.

These and other aspects of the invention will be apparent from and elucidated with reference to the embodiments described hereinafter.

DETAILED DESCRIPTION OF THE INVENTION

Figure 1A:
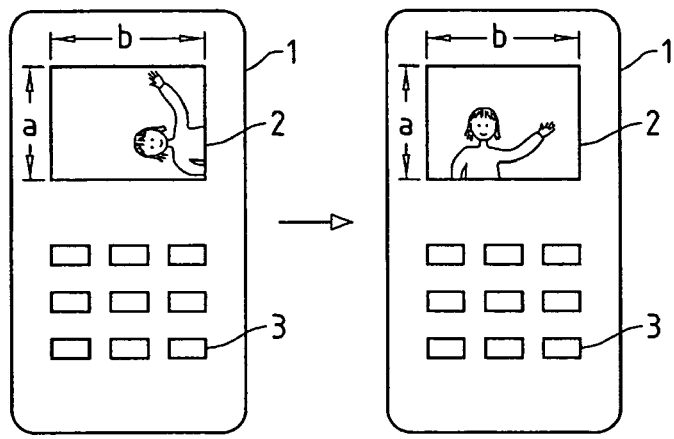
FIG. 1a: a first example of a change of the orientation of a UI according to the prior art.
Figure 1B:
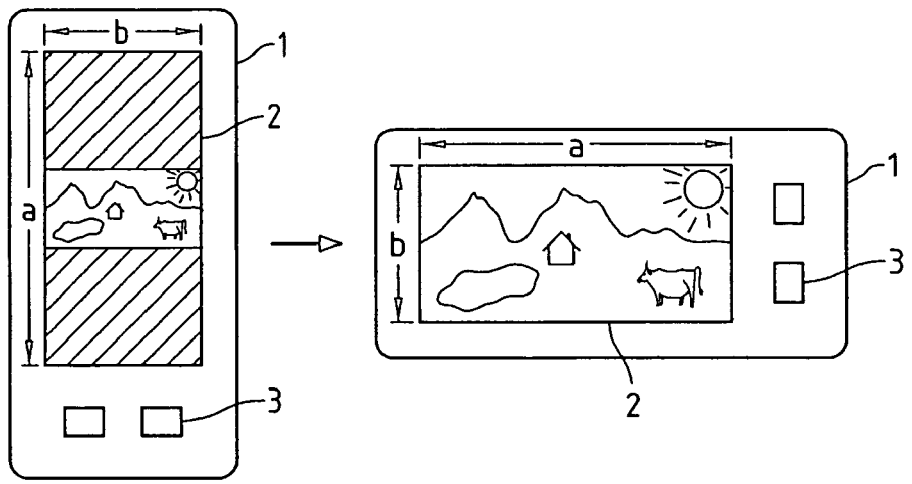
FIG. 1b: a second example of a change of the orientation of a UI according to the prior art.
Figure 1B:
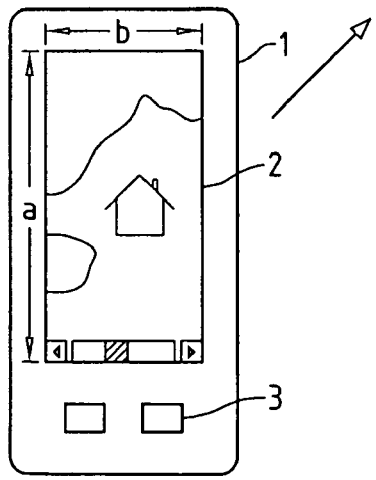
Figure 2A:
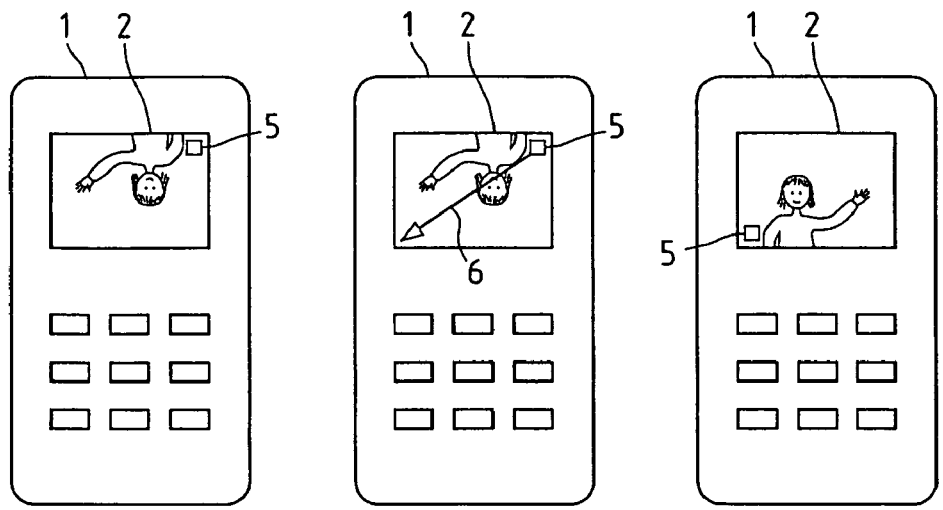
FIG. 2a: a first embodiment of a mobile phone according to the present invention, wherein a change of the orientation of a UI by 180° is initiated by dragging.

FIG. 2a depicts a first embodiment of a mobile phone 1 according to the present invention. On the UI 2 of the mobile phone 1 on the left of FIG. 2a, which is exemplarily assumed to be a touch-screen display, an image is shown upside-down. Furthermore, according to the present invention, a dragging element 5 is shown in the right upper corner of the touch-screen display 2. The center figure of FIG. 2a schematically depicts how a user of the mobile phone 1 selects the dragging element 5, for instance by tipping it with a stylus, and drags it to the left lower corner of the display, as indicated by arrow 6. The mobile phone detects this course of motion 6 on its display and changes the orientation of the display by 180° degrees, as shown in the right figure of FIG. 2a, so that the image now can be viewed properly.

Figure 2B:
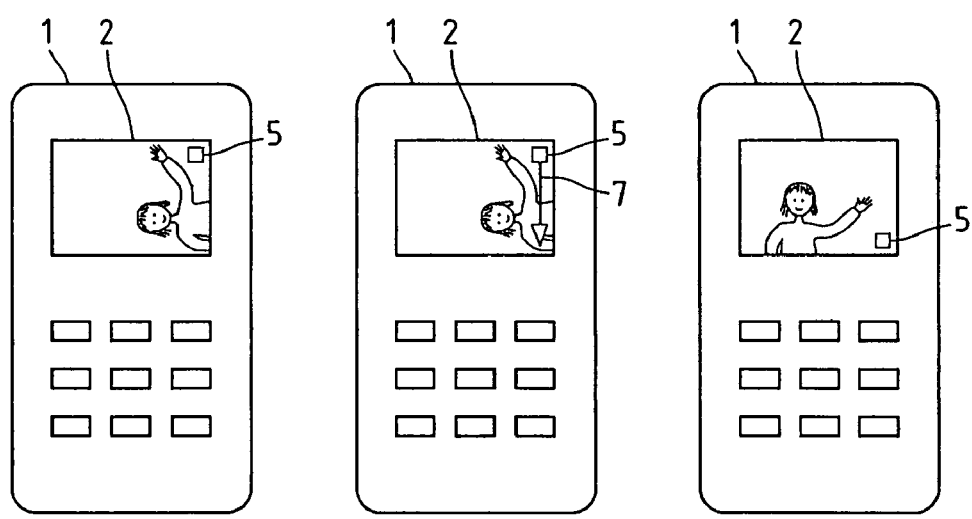
FIG. 2b: a first embodiment of a mobile phone according to the present invention, wherein a change of the orientation of a UI by 90° is initiated by dragging.

In FIG. 2b, the touch-screen display 2 of the mobile phone 1 is rotated by 90° clockwise by a user by dragging the dragging element 5 from the right upper corner to the right lower corner of the display, as indicated by the arrow 7. Whereas in the left figure of FIG. 2b, the image can not be properly viewed on the display, in the right figure of FIG. 2b, the orientation of the touch-screen display 2 has been changed in a way that the image now can be properly viewed.

Figure 3A:
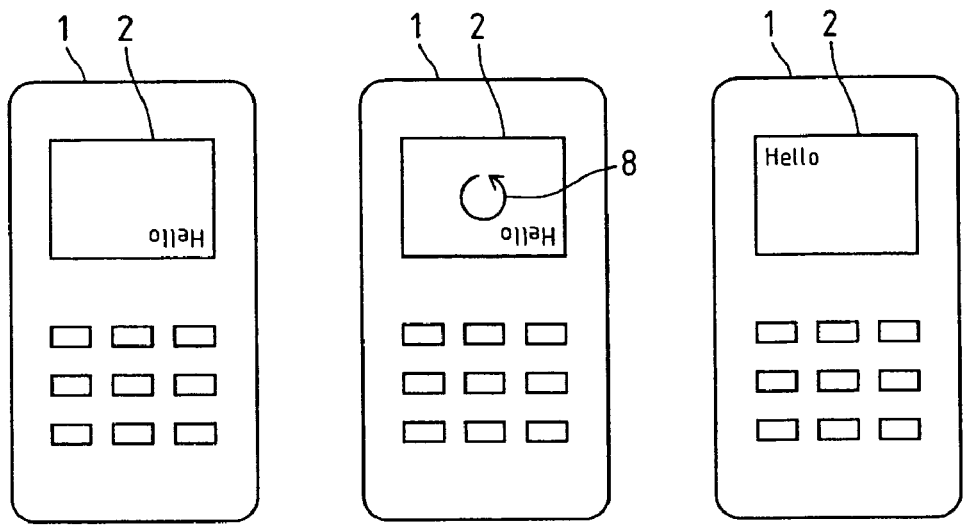
FIG. 3a: a second embodiment of a mobile phone according to the present invention, wherein a change of the orientation of a UI by 180° is initiated by drawing a gesture.

In FIG. 3a, text is rendered by a touch-screen display 2 of a mobile phone 1, wherein said text is upside-down (see left figure). By drawing a gesture 8 on the touch-screen display 2 of the mobile phone 1, a user can change the orientation of the touch-screen display 2 by 180° degrees. In the example in the center figure of FIG. 3a, this gesture is a complete circle 8 drawn counter-clockwise. As can be seen from the right figure of FIG. 3a, after the change of the orientation of the display 2, the text is in correct position and can be properly read.

Figure 3B:
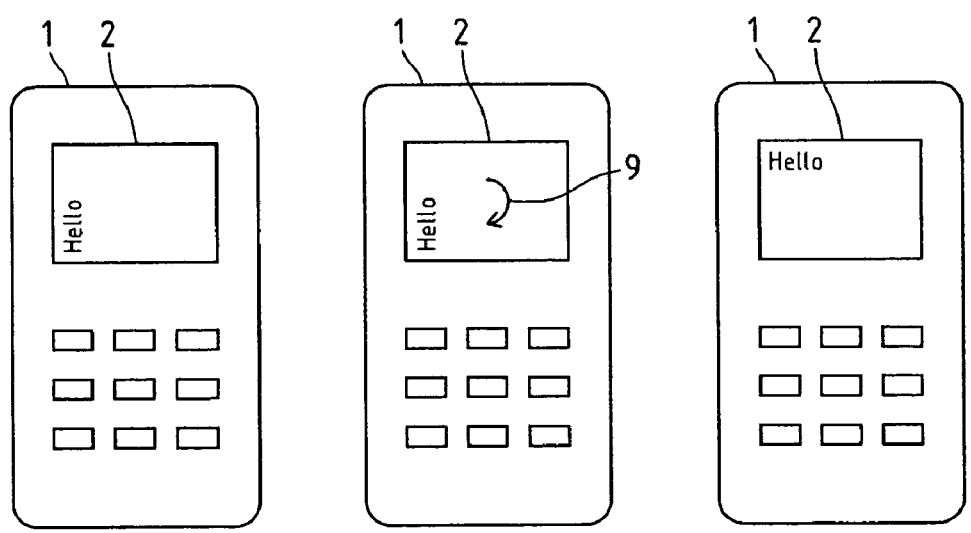
FIG. 3b: a second embodiment of a mobile phone according to the present invention, wherein a change of the orientation of a UI by 90° is initiated by drawing a gesture.

Quite similarly, in FIG. 3b, text that is rotated by 90° counter-clockwise (left figure) can be read properly (right figure) by changing the orientation of the display 2 by 90° clockwise, wherein a half circle 9 drawn clockwise is used as a gesture (center figure).

It is apparent that the present invention allows for a convenient way of changing the orientation of a UI that does not require additional hard keys on the device and that does not require to browse a menu to trigger the change of the orientation. In contrast, the input capabilities that are naturally offered by a touch-screen display or by a display on which characters or curves can be drawn by using a joystick, a mouse, or a track-ball, are used. With the dragging method, at least three rotation directions can be intuitively defined, when the dragging element is located in a corner of the UI. When the dragging element is located in the center of the UI, for instance being transparent to a certain degree in order not to cover too much of the actual content, more rotation directions may be defined. With the gesture-based method, an even more robust way of initiating the change of orientation of a UI is presented, which is in particular advantageous in mobile environments, because a simple gesture such as a circle (or approximation thereof) can always be easily and precisely drawn.

Figure 4:
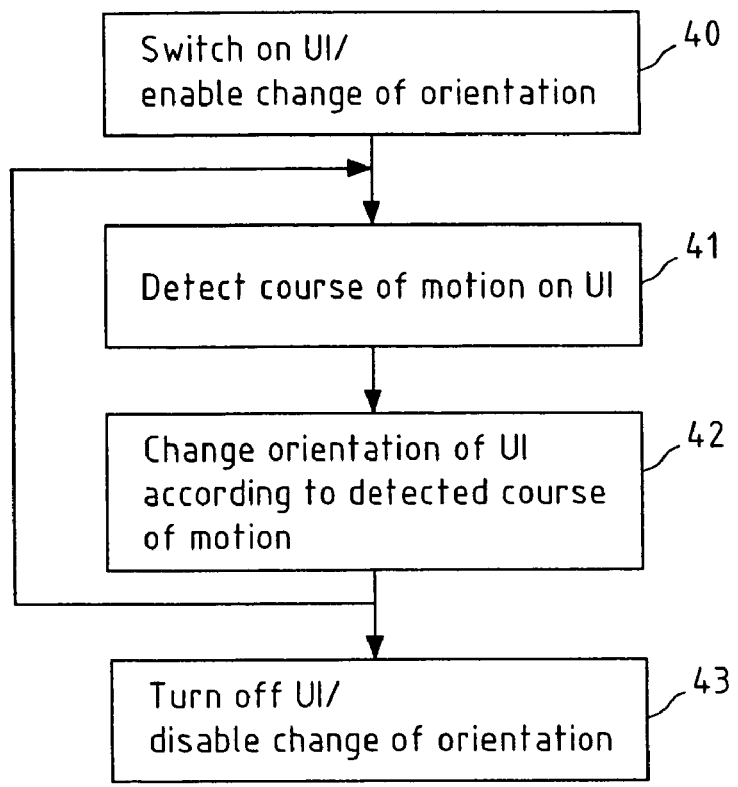
FIG. 4: a flow chart of the method according to the present invention.

FIG. 4 depicts a flowchart of the method according to the present invention. In a first step 40, the UI is turned on, or the dragging-based or gesture-based change of orientation of the UI is activated, for instance by menu selection of the user. It is then continuously checked in a step 41 whether a course of motion is performed on the UI, either by dragging or drawing a gesture on a touch-screen display or by writing or drawing characters with a display interaction means such as a joystick or track-ball. In a step 42, the orientation of the UI is then changed according to the detected course of motion. The steps 41 and 42 are continuously repeated to allow for multiple rotations of the orientation of a UI for the same displayed content or for a sequence of different content, until the UI is turned off or until the dragging-based or gesture-based change of orientation of the UI is deactivated in a step 43.

Figure 5:
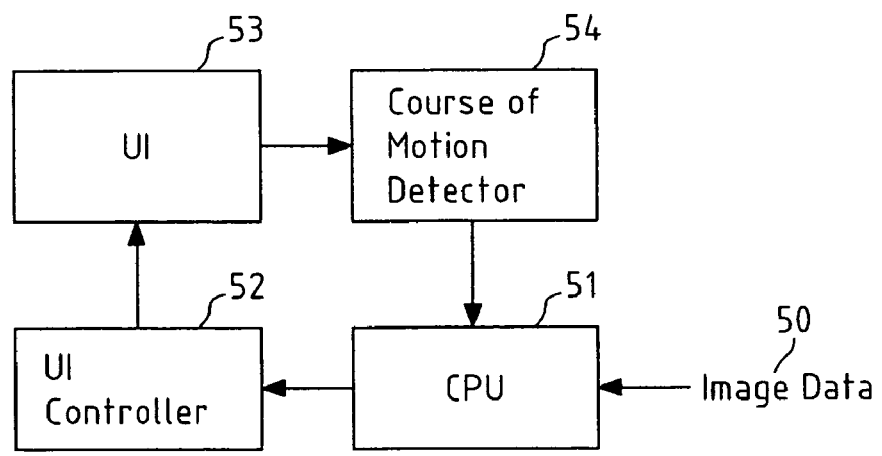
FIG. 5: a device according to the present invention.

FIG. 5 depicts a device according to the present invention. The device comprises a UI 53. Image data 50 is processed by a Central Processing Unit (CPU) 51, which may for instance be the CPU of a mobile phone. Processing may comprise converting the format of image data 50 or the like. The converted image data then is forwarded to a UI controller 52, which drives the UI 53 according to the converted image data that is output by the CPU. The UI is connected to a course of motion detector 54, which detects whether any course of motion is performed on the UI 53 by a user of the mobile phone. The course of motion detector 54 may process the output signals of a touch-screen display 53, or may be capable of processing the input of a display interaction device such as a joystick, track-ball or the like. Detected course of motion then is signaled to the CPU 51, which determines the angle by which the orientation of the UI has to be changed, and converts the image data 50 accordingly, so that the image displayed on the UI 53 is rotated as indicated by the user of the mobile phone in his performed course of motion on the UI. Said conversion may further comprise transformation of the dimensions of the image to fit both the width and height of the rotated UI, or re-scaling of the image to fit either the width or the height of the rotated UI. Image data conversion may equally well be performed by the UI controller 52 instead of the CPU 51.

The invention has been described above by means of embodiments. It should be noted that there are alternative ways and variations which are obvious to a skilled person in the art and can be implemented without deviating from the scope and spirit of the appended claims. In particular, the invention is by no means limited to application in mobile phones or PDAs, it can also be used to change the orientation of a UI in television sets or computer monitors. Various different kinds of visible and invisible dragging elements can be imagined for the dragging-based methods, and various kinds of segmented gestures representing different angles of rotation and families of gestures, wherein each family member defines one specific angle of rotation, may be thought of. The dragging-based method and the gesture-based method are well suited for joint application in the same device.

The invention claimed is:

1. A method comprising:
   displaying an image containing content together with a dragging element superimposed on top of the image content when positioned over said content on a user interface, wherein said dragging element is independent of said content displayed on said user interface and is displayed at a predetermined position of said user interface;
   detecting a course of motion that is performed on said user interface by dragging said dragging element, wherein said course of motion comprises dragging said dragging element from said predetermined position at which said dragging element is displayed to another position of said user interface, and
   changing an orientation of said user interface for displaying said image with respect to a physical device said user interface is integrated in according to said detected course of motion.

2. The method according to claim 1, wherein said course of motion is performed on said user interface via a user interface interaction device.

3. The method according to claim 2, wherein said user interface is a touch-screen display and wherein said user interface interaction device is a touching device.

4. The method according to claim 2, wherein said user interface interaction device is a device configured to control the movement of an element on said user interface.

5. The method according to claim 1, wherein said dragging element is located near an edge of the user interface.

6. The method according to claim 1, wherein said detected course of motion is visualized on said user interface.

7. The method according to claim 1, wherein said orientation of said user interface is changed by 90°, 180° or 270° with respect to said physical device said user interface is integrated in.

8. The method according to claim 1, wherein images that are displayed on said user interface are transformed and/or re-scaled according to said changed orientation.

9. The method according to claim 1, wherein said user interface is integrated in a hand-held device, in particular a mobile phone or a personal digital assistant.

10. A computer readable medium storing a computer program with instructions so that when executed by a processor performs the method of claim 1.

11. The method according to claim 1, wherein said dragging element is a soft button that is provided on said user interface for other purposes and is assigned additional functionality to initiate said change of said orientation of said user interface only when being dragged across said user interface.

12. The method according to claim 1, wherein said user interface is a touch-screen display, and wherein said orientation of said touch-screen display is changed by rotating the complete display and input control logic.

13. The method according to claim 1, wherein said predetermined position is a corner of said user interface.

14. The method according to claim 13, wherein dragging said dragging element from said corner to a neighboring corner causes said orientation of said user interface to be changed by 90° with respect to said device said user interface is integrated in.

15. The method according to claim 13, wherein dragging said dragging element from said corner to a diagonally opposite corner causes said orientation of said user interface to be changed by 180° with respect to said device said user interface is integrated in.

16. An apparatus comprising:
   a detector configured to detect a course of motion that is performed on a user interface by dragging a dragging element displayed on said user interface together with an image containing content, the dragging element superimposed on top of the image containing content when positioned over said content, wherein said dragging element is independent of said content displayed on said user interface and is displayed at a predetermined position of said user interface, and wherein said course of motion comprises dragging said dragging element from said predetermined position at which said dragging element is displayed to another position of said user interface, and
   a processor and controller configured to
   change said orientation of said user interface for displaying said image with respect to a physical device said user interface is integrated in according to said detected course of motion.

17. The apparatus according to claim 16, wherein said apparatus is integrated in a hand-held device, in particular a mobile phone or a personal digital assistant.

18. An apparatus according to claim 16, further comprising:
   at least one user interface.

19. The apparatus according to claim 18, further comprising a user interface interaction device, via which said course of motion is performed on said at least one user interface.

20. The apparatus according to claim 19, wherein said at least one user interface is a touch-screen display and wherein said user interface interaction device is a touching device.

21. The apparatus according to claim 19, wherein said user interface interaction device is a device configured to control the movement of an element on said at least one user interface.

22. The apparatus according to claim 16, further configured to visualize said detected course of motion on said at least one user interface.

23. The apparatus according to claim 16, wherein said apparatus is configured to change said orientation of said at least one user interface by 90°, 180° or 270° with respect to said physical device said user interface is integrated in.

24. The apparatus according to claim 16, further configured to transform and/or re-scale images that are displayed on said at least one user interface according to said changed orientation.

25. The apparatus according to claim 16, wherein said dragging element is a soft button that is provided on said user interface for other purposes and is assigned additional functionality to initiate said change of said orientation of said user interface only when being dragged across said user interface.

26. The apparatus according to claim 16, wherein said user interface is a touch-screen display, and wherein said apparatus is configured to change said orientation of said touch-screen display by rotating the complete display and input control logic.

27. The apparatus according to claim 16, wherein said predetermined position is a corner of said user interface.

28. The apparatus according to claim 27, wherein said apparatus is configured so that dragging said dragging element from said corner to a neighboring corner causes said orientation of said user interface to be changed by 90° with respect to said device said user interface is integrated in.

29. The apparatus according to claim 27, wherein said apparatus is configured so that dragging said dragging element from said corner to a diagonally opposite corner causes said orientation of said user interface to be changed by 180° with respect to said device said user interface is integrated in.

30. An apparatus comprising:

means for displaying an image containing content together with a dragging element superimposed on top of the image content when positioned over said content on a user interface, wherein said dragging element is independent of said content displayed on said user interface and is displayed at a predetermined position of said user interface;

means for detecting a course of motion that is performed on said user interface by dragging said dragging element, wherein said course of motion comprises dragging said dragging element from said predetermined position at which said dragging element is displayed to another position of said user interface, and means for changing an orientation of said user interface for displaying said image with respect to a physical device said user interface is integrated in according to said detected course of motion.

\* \* \* \* \*